United States Patent Office 2,959,149
Patented Nov. 8, 1960

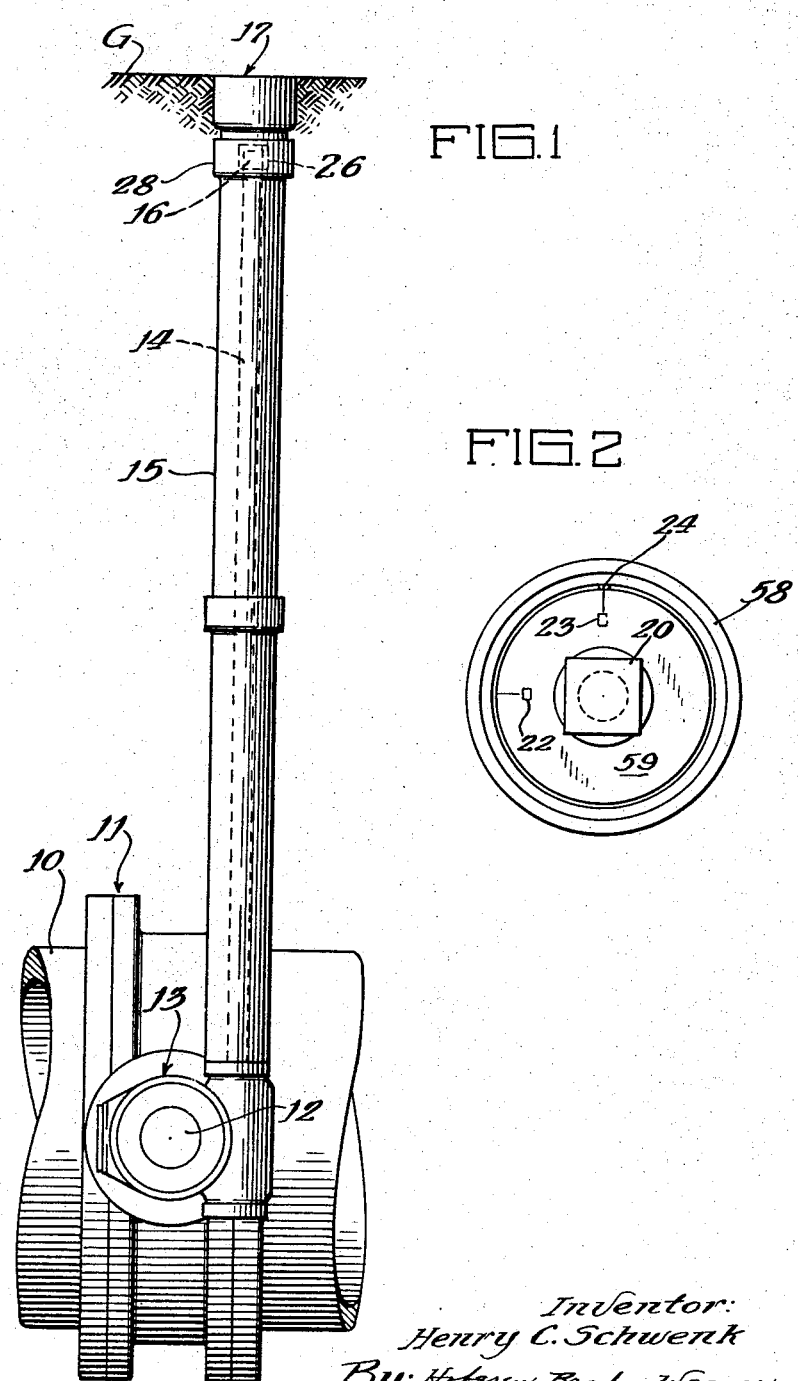

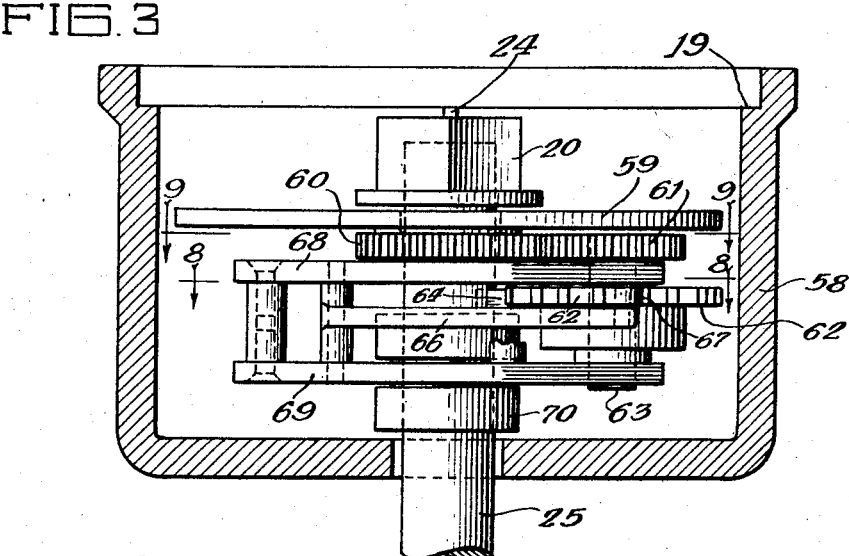
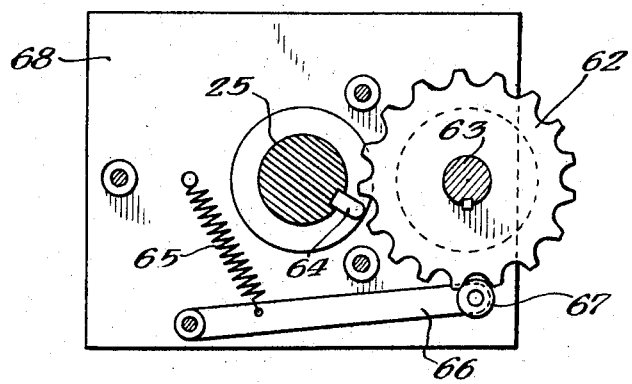
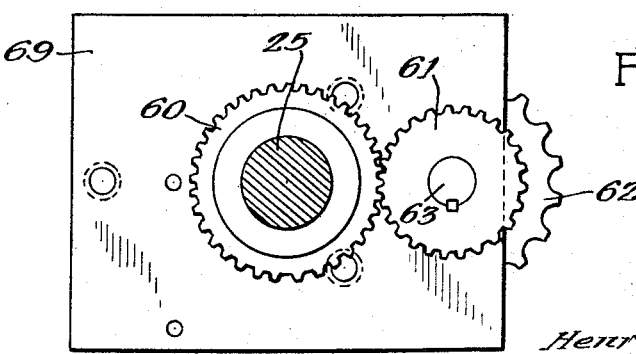

2,959,149

VALVE OPERATOR AND POSITION INDICATOR

Henry C. Schwenk, Glenview, Ill., assignor to Henry Pratt Company, a corporation of Illinois Original application Mar. 14, 1957, Ser. No. 645,943. Divided and this application Mar. 2, 1959, Ser. No. 796,499

3 Claims. (Cl. 116—125)

This invention relates to a valve operator and position indicator and more particularly to such a unit which may be placed upon the end of an existing valve operating shaft, particularly where the valve itself is inaccessible.

This application is a division of my copending application Serial No. 645,943, filed March 14, 1957.

In many water work systems, there are valves in lines which are inaccessible because of being buried or in other locations out of reach of workmen. Valves in distribution lines are generally below ground and an operating shaft for the valve is carried up to the ground level inside a pipe housing. A cover on the housing may be removed to expose the shaft for the reception of a key by which the shaft may be turned and the valve thusly opened or closed. In the past, workmen have generally made an assumption as to whether a particular inaccessible valve was opened or closed. The valve operating shaft was turned manually and the workmen were able to "feel" whether or not they had turned the shaft sufficiently to open or close the valve as the case might be. The resistance to turning varied at the extreme positions of the valve in relation to the resistance to turning intermediate the positions. Such procedure resulted in damage to some valves when the assumption arrived at was wrong, but has been generally followed in the absence of a more satisfactory operating procedure.

The introduction and more extensive use of butterfly valves in waterworks systems has complicated the problem since such valves turn quite easily and have very little of the "feel" at the extreme positions of the valve. Workmen, accustomed to opening and closing other kinds of valves, have caused damage to butterfly valves because of the absence of this "feel" which told them when the valve had reached its desired position.

The primary object of this invention is to provide a new and improved combination valve operator and position indicator.

Another object is to provide an indicator of a valve position which may be installed on the accessible portion of a valve operating shaft.

Another object is to provide a valve operator and position indicator which may be mounted in an accessible position so that the removal of its cover may expose both the valve operating shaft and an indicator driven therefrom.

A further object is to provide such an indicator for valve positioners which can be turned through less than 360° by a valve operating shaft which may be required to make many turns to move the valve between this extreme position.

A further object is to provide a valve operator and position indicator which is simply and economically constructed.

Other objects and advantages of the present invention will be understood from the following description of embodiments of the invention illustrated in the accompanying drawings, in which:

Figure 1 is a fragmentary broken elevational view of a buried valve having the invention mounted thereon;

Figure 2 is a reduced plan view of the unit with its cover removed;

Figure 3 is a broken elevational view in section of a preferred form of the combined operator and position indicator device;

Figure 4 is a sectional view through the device taken substantially along line 4—4 in Figure 3;

Figure 5 is a sectional view through the device shown in Figure 3 taken substantially along line 5—5 in Figure 3.

The problem of indicating the position of a valve which is buried and thus inaccessible may be illustrated with reference to Figure 1. A pipe line 10 below the ground level G has a butterfly-type valve 11 mounted therein and having a shaft 12 upon which is mounted a gear box 13 in order to turn the shaft through approximately 90 degrees to open or close the valve. The valve is opened or closed by turning the gears in the gear box. For this purpose, an operating shaft extension 14 extends upwardly from the gear box within an iron pipe housing 15 to a location generally near the ground surface. The upper end of the shaft is provided with a standard squared nut 16 for the reception of a socket-type of key.

The position indicator and operator 17 of this invention is mounted on top of the pipe housing 15 and connected with the valve operating shaft extension 14. With the use of the present position indicator, a workman does not have to make any assumptions as to the position of the inaccessible valve. Ordinarily, the unit of this invention is provided with a cover which, when removed, will expose the nut upon which the key may be placed and also will expose the position indicator.

The unit itself has a circular housing 58 with an upper ledge 19 for receiving a cover. When the cover is removed, the interior of the unit has an appearance as illustrated in Figure 2. A standard water works square nut 20 for turning the valve is fully exposed for the reception of a key. An indicating disk 59 has marked on there a legend 22 such as the letter "O" and a second legend 23 such as the letter "C" which indicate the position of the valve relative to a mark or boss 24 formed on the housing. The disk 59 is caused to move arcuately about the center shaft portion 25 in the unit as the valve is opened or closed. It is preferred that the disk move about 270 degrees even though the shaft may have to turn from seventeen turns upwardly to open and close the valve. The number of turns of shaft 14, of course, depends upon the gear ratio employed in the box 13.

The inner end of the shaft portion 25 in the unit may be provided with a socket 26 to fit over the square nut 16 on the top of the valve operating shaft 14. The short shaft portion 25 is a part of the unit permitting the unit to be manufactured, as such, and merely attached to the usual valve shaft extension. A lower flange or other suitable mounting structure on the housing may be provided for fitting the housing onto the bell 28 of the housing 15. Other suitable connections may be made to mate with the design of the pipe housing 15 used in any particular installations.

In order that the disk move about the shaft less than one turn for many turns of the shaft itself, a transmission mechanism is mounted about the shaft to effect such movement. The mechanism includes the thin, flat indicating disk 59 carried by a circular center gear 60 both of which are idly mounted about shaft 25. The center gear is driven by a circular spur gear 61 in adjacent meshing position. The spur gear is mounted on a vertical stub shaft 63 and is advanced step-by-step in a rotary path by a circular ratchet wheel 62. The ratchet wheel is keyed to the said stub shaft in a lower vertical position. The ratchet wheel is, in turn, advanced by a pawl 64 secured to the shaft 25 in position to engage one tooth of the ratchet wheel upon each revolution. A spring 65 yieldingly urges an arm 66 in a direction to engage its roller 67 against the teeth of the ratchet to insure step-by-step advancement. The number of teeth in the ratchet may be chosen to obtain the desired movement of the indicating disk relative to the number of turns of the shaft 25 required to open and close the valve. Also, the gears 60 and 61 may be changed to vary the ratio of disk movement to shaft movement. The entire transmission may be mounted between spaced plates 68 and 69 and enclosed, if desired. A lower collar 70 may be used to hold the unit on the shaft 25.

The above described unit permits the position indicator to be mounted in the location of the valve operating shaft where a workman will be sure to observe and notice the indicator. The use of the unit insures that a valve position is a known factor and no longer subject to conjecture. Damage to valve due to excessive turning of the operating shaft may thus be avoided.

The foregoing detailed description has been given for clearness of understanding only and no unnecessary limitations should be understood therefrom, for some modifications will be obvious to those skilled in the art.

I claim:

1. A covered, unitary, self-contained valve operator and position indicator unit adapted for attachment to the end of an underground rotary valve operating shaft, comprising: a housing; a shaft in the housing having means for connection to the valve operating shaft at one end, and an operating key-receiving nut at the other end; a position indicating disk in said housing concentric with and being arcuately movable about the shaft relative to the housing; a transmission mechanism connecting the shaft and disk, said mechanism having a ratchet wheel drivingly connected to said indicating disk and a driving key connected to said shaft in position to engage said wheel and advance the same one step for each revolution of said shaft, said ratchet wheel and key turning the indicating disk proportionally to the turning of the shaft and through a position indicating arc less than a full turn about the shaft; and a frame supporting said ratchet wheel for pivotal movement beside said shaft, said frame surrounding and being carried by said shaft.

2. A valve covered, unitary, self-contained operator and position indicator unit for attachment to the end of an underground rotary valve operating shaft, comprising: a housing having a removable upper cover; a central shaft portion in the housing having means for connection to said valve operating shaft and a nut exposed upon removal of said cover for receiving a key permitting turning of the operating shaft to open and close the valve; an indicator member in said housing mounted for rotation about the shaft portion and movable arcuately relative to the housing; a transmission mechanism connecting the shaft and indicator member, said transmission having a ratchet wheel in the housing and a driving pawl on the shaft arranged to advance the wheel one step with each complete turn of the shaft, said ratchet wheel being drivingly connected with said indicator member to rotate the same through less than one complete revolution between open and closed positions of said valve.

3. A unit as specified in claim 2 wherein the ratchet wheel is mounted on a stub shaft rotatable in a frame secured against movement relative to said housing and said stub shaft is connected by gears to turn the indicator member relative to said housing.

References Cited in the file of this patent

UNITED STATES PATENTS

| | | |
|---|---|---|
| 467,796 | Ferrell | Jan. 26, 1892 |
| 1,896,850 | Perry | Feb. 7, 1933 |
| 2,767,681 | Pontius | Oct. 23, 1956 |